United States Patent

Woodruff

[11] 4,029,246
[45] June 14, 1977

[54] ADJUSTABLE STABLE CAMERA SUPPORT FOR VEHICLES

[76] Inventor: Robert L. Woodruff, P.O. Box 1008, Florissant, Mo. 63031

[22] Filed: Apr. 13, 1976

[21] Appl. No.: 676,521

[52] U.S. Cl. .................. 224/42.45 B; 248/205 R; 354/293
[51] Int. Cl.² ........................................ B60R 11/04
[58] Field of Search .............. 224/5 V, 29 R, 29 D, 224/42.42 A, 42.43, 42.44, 42.45 B, 42.46 B; 108/45, 132, 44, 131, 133; 354/75, 76, 81, 293; 352/243; 248/166, 168, 439, 188.6, 188.8, 205 R; 280/179 A

[56] References Cited

UNITED STATES PATENTS

| | | | |
|---|---|---|---|
| 2,144,049 | 1/1939 | Forcier | 248/168 X |
| 2,518,538 | 8/1950 | Giblin | 224/42.43 X |
| 2,640,634 | 6/1953 | Francis | 224/29 D X |
| 2,867,484 | 1/1959 | Jennings | 108/45 |
| 2,896,891 | 7/1959 | Ernst | 248/168 |
| 2,898,170 | 8/1959 | Antonius | 224/29 R X |
| 3,709,159 | 1/1973 | Oglesby, Jr. | 108/132 |
| 3,752,376 | 8/1973 | Shelton | 224/42.45 B |

FOREIGN PATENTS OR APPLICATIONS 146,544  8/1954  Sweden .............................. 248/166

Primary Examiner—Robert J. Spar
Assistant Examiner—Winston H. Douglas
Attorney, Agent, or Firm—D. Paul Weaver

[57] ABSTRACT

A camera support for automobiles and like vehicles utilizes the top of the vehicle instrument panel and the front seat cushion as a rest means for the support structure. Rear divergent telescoping legs impart lateral stability and height and angle adjustability. An elastic element interconnects the support and instrument panel to hold down the support structure. The rear telescoping legs are foldable to stowed positions within the channel supporting member.

2 Claims, 4 Drawing Figures

ADJUSTABLE STABLE CAMERA SUPPORT FOR VEHICLES

BACKGROUND OF THE INVENTION

Automobile camera supports are known in the prior art, and examples of the patented prior art are U.S. Pat. Nos. 2,804,278 and 3,752,376.

The general objective of this invention is to improve on the known prior art by providing a more simplified support structure for cameras in vehicles and one which is more convenient to install and use as well as more economical to manufacture.

A further important object of the invention is to provide a camera support for automobiles which requires no alteration of the vehicle structure whatsoever to install and use and no marring or defacing of the interior of the vehicle or removal of any vehicle part. A feature of the invention is that the simplified structure can be accepted by practically any domestic or foreign automobile with convenience and without the use of threaded or similar mechanical fasteners.

By the use of an improved telescoping rear end bipod support means, the camera support beam may be leveled or set at a desired angle to the horizontal with stability in all adjusted positions, and the support beam requires no mechanical tying into a door or other side structure of the vehicle. Gravity is utilized to mount the device with the front of the camera support beam resting on top of the instrument panel and the rear bipod support means resting on the front seat cushion.

Other features and advantages of the invention will become apparent during the course of the following description.

BRIEF DESCRIPTION OF DRAWING FIGURES

DETAILED DESCRIPTION

Figure 1:
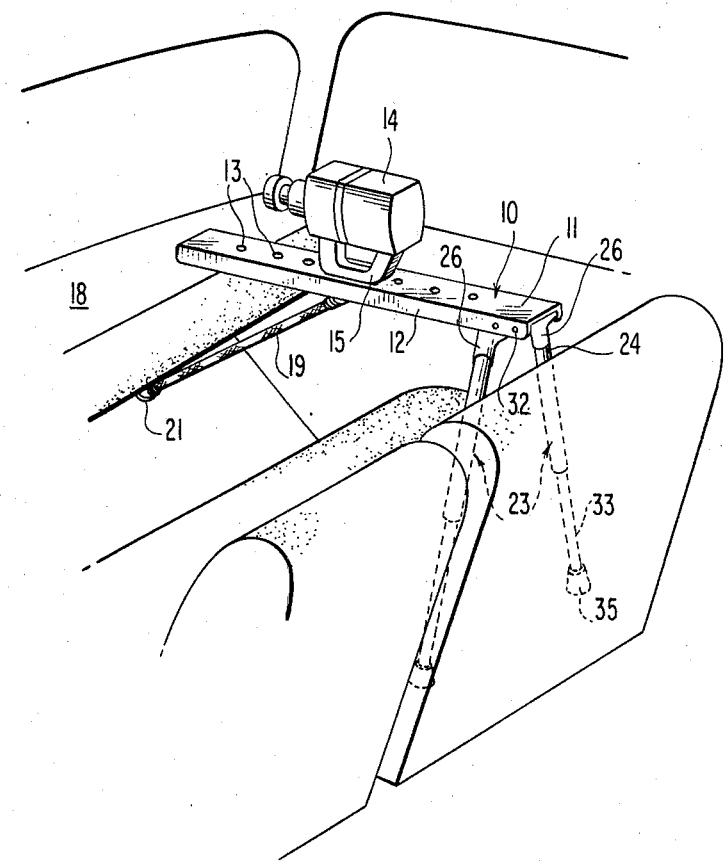
FIG. 1 is a perspective view of a camera support for vehicles according to the invention.

Referring to the drawings in detail wherein like numerals designate like parts, the numeral 10 designates a rigid support beam of channel formation including a top web 11 and downturned side longitudinal flanges 12. The top web 11 of the support beam has a plurality of longitudinally spaced apertures 13 formed therethrough in a central row to allow a portable camera 14 to be attached to the beam 10 in a variety of positions along the beam in the fore and aft directions.

The camera 14 is anchored to the support beam 10 through its conventional handle means 15 substantially as disclosed in U.S. Pat. No. 3,752,376. An eye screw 16 is insertable through any of the several openings 13 into a screw-threaded opening in the bottom of handle means 15, preferably with a washer 17 intervened between the handle means and the top web 11. The forward end of beam 10 rests on the top of the vehicle instrument panel 18 when installed in the vehicle and an elastic hold down and stabilizing cord 19 has an upper terminal hook 20 releasably engaged with the eye screw 16 and a lower end terminal hook 21 releasably engaged with a bottom lip 22 of instrument panel 18.

The rear end of support beam 10 is carried or supported by a foldable bipod structure comprising a pair of divergent telescoping legs 23 whose upper tube sections 24 form sockets for pin extensions 25 of casting heads 26 by means of which the bipod legs are pivotally attached to the support beam 10.

The tops of heads 26 are received between the side flanges 12 and are apertured at 27, FIG. 3, to receive a transverse pivot pin 28 anchored to the flanges 12 somewhat below the top web 11. A compression spring 29 surrounds the pin 28 and has its opposite ends received in recesses 30 of casting heads 26. The spring 29 urges the outer parallel faces of the heads 26 into contact with the opposing parallel inner faces of side flanges 12 when the bipod leg support is extended for usage to a vertical position, FIGS. 1 and 2. Small detent elements 31 or projections on the outer sides of heads 26 are received lockingly in detent openings 32 formed in the flanges 12 near their rear ends and rearwardly of the pin 28 when the legs 23 are extended for normal use to a vertical position.

Figure 3:
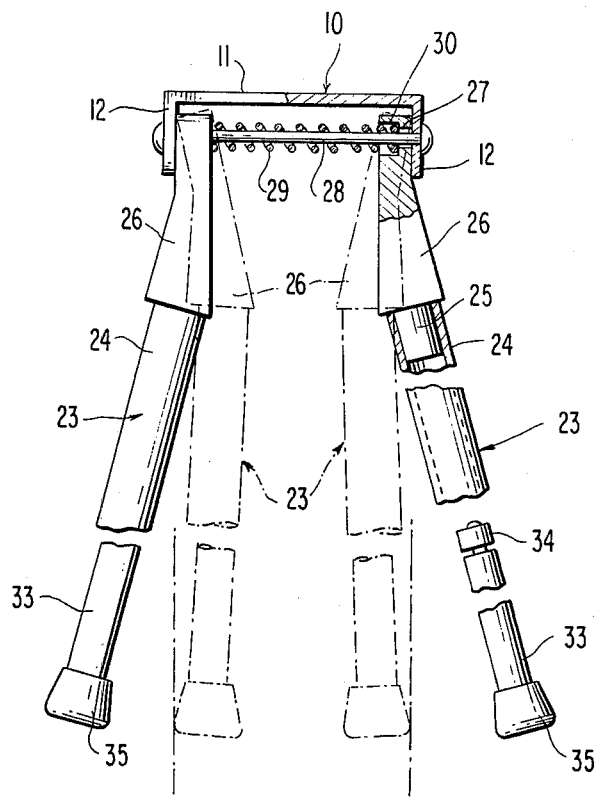
FIG. 3 is an end elevational view of the device, partly in section.
Figure 4:
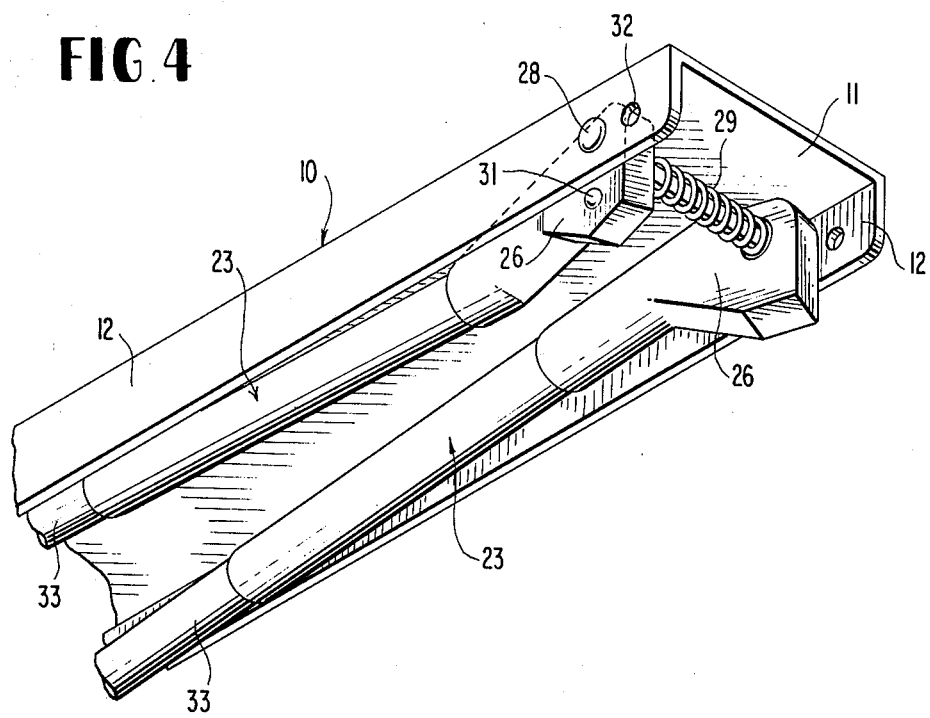
FIG. 4 is an enlarged fragmentary perspective view showing the support folded for storage or packaging.

When the support is removed from the vehicle for storage or when it is packaged, the legs 23 are folded forwardly and upwardly into the bottom of the channel beam 10, FIG. 4. To accomplish this, the casting heads 26 are pressed toward each other along the axis of pin 28, and the spring 29 will yield to permit this movement. Enough clearance is provided at the openings 27 to allow the divergent legs to assume more nearly parallel positions, FIG. 3, and the two legs are swung upwardly to their stowed positions as shown in FIG. 4, with the detent elements 31 released from the locking apertures 32.

Figure 2:
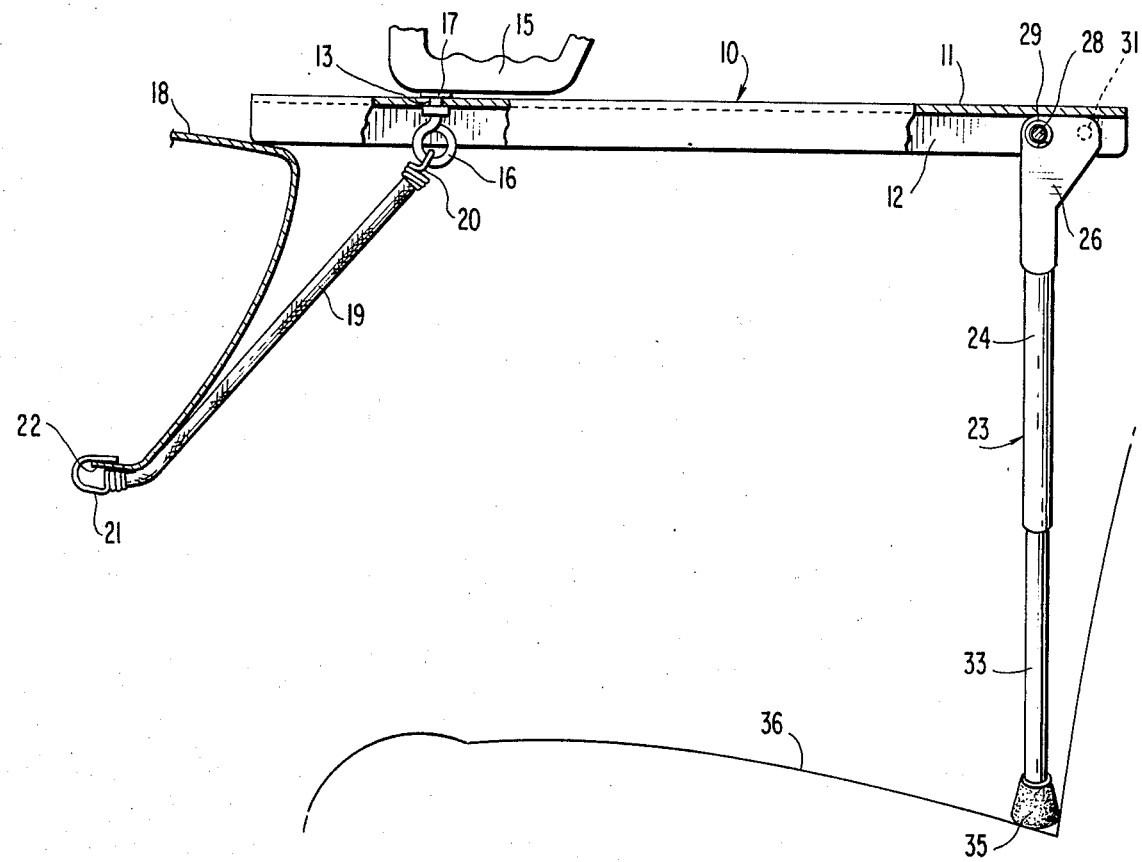
FIG. 2 is an enlarged fragmentary side elevation of the invention, partly in section.

The lower telescoping sections 33 of the bipod legs are equipped with conventional eccentric washer locking means 34, FIG. 3, whereby the legs will remain in any selected length adjusted positions and may be released for further adjustment or collapsing by a simple twisting action, as is well known. The lower ends of the legs are equipped with rubber or plastic caps 35 which rest upon the front seat cushion 36 of the vehicle in the manner illustrated in FIG. 2, when the device is in use. As shown in FIG. 2, the legs 23 are at right angles to the beam 10 when in the use positions.

The support beam 10 may be leveled or set at any desired angle to the horizontal by merely adjusting the lengths of the telescoping bipod legs, the front end of the beam then merely pivoting or rocking relative to the instrument panel top 18. The elastic cord 19 pulls the support firmly in contact with the instrument panel thus eliminating bouncing or vibration and adding to the stability of the support. The divergent legs 23 render the device stable laterally without the need for any transverse bracing means tying into the side structure of the vehicle.

The structure is very simple, economical to manufacture and highly convenient to use. Its foldability renders it easy to store when not in use. The advantages of the device over the prior art should now be fully apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A stable adjustable camera support for vehicles comprising an elongated camera supporting channel beam having a plurality of longitudinally spaced openings in its top web and having downturned side flanges, the forward end of said channel beam during use adapted to rest on top of a vehicle instrument panel, a camera engaging eye screw engageable selectively through any of said openings from below the channel beam to secure a camera in a selected adjusted position fixedly on top of the channel beam, an elastic flexible hold-down and stabilizing means for the channel beam having opposite end hooks, one hook engageable with the vehicle instrument panel and the other hook engageable with said eye screw, a pair of rear telescopically adjustable foldable support legs for the rear end of said channel beam adapted to rest on a vehicle front seat cushion in laterally divergent relationship, heads secured to the tops of said legs and each said head having outer parallel faces which lie immediately inwardly of said side flanges when the legs are in a vertical use position, a pivot pin for said heads connected to and extending between said side flanges, the heads being apertured to loosely receive said pin, and an expansion spring on said pivot pin engaging said heads and urging them outwardly into contact with said side flanges, whereby when said legs are extended for usage to the vertical use position the channel beam may be leveled or set at any desired angle to the horizontal by merely adjusting the lengths of the support legs and when said legs are moved toward each other from the laterally divergent relationship to a nearly parallel position said legs may then be pivoted on said pin into a folded stored relationship in said channel beam and between said downturned side flanges.

2. A stable adjustable camera support for vehicles as defined in claim 1, and said side flanges having aligned detent openings near and rearwardly of the axis of said pivot pin, and said heads having parts which are eccentric to said pivot pin and said parts carrying detent projections on their outer sides which snap into the detent openings when said legs are rotated to the vertical use positions on said pivot pin, said heads having substantially flat top faces which then abut the bottom of said top web of the camera supporting channel beam.

* * * * *